US011313352B2

(12) United States Patent
Al-Yagon

(10) Patent No.: US 11,313,352 B2
(45) Date of Patent: Apr. 26, 2022

(54) YAW CONTROL DEVICE FOR A WIND TURBINE

(71) Applicant: WIND BUZZ LTD., Tel Aviv (IL)

(72) Inventor: Yossi Al-Yagon, Tel-Aviv (IL)

(73) Assignee: Wind Buzz Ltd., Tel Aviv (IL)

( * ) Notice: Subject to any disclaimer, the term of this patent is extended or adjusted under 35 U.S.C. 154(b) by 0 days.

(21) Appl. No.: 17/397,531

(22) Filed: Aug. 9, 2021

(65) Prior Publication Data

US 2021/0363966 A1 Nov. 25, 2021

Related U.S. Application Data

(63) Continuation of application No. PCT/US2020/019850, filed on Feb. 26, 2020.

(60) Provisional application No. 62/810,557, filed on Feb. 26, 2019.

(51) Int. Cl.
*F03D 7/02* (2006.01)
*F03D 9/25* (2016.01)
*F03D 15/00* (2016.01)
*F03D 1/04* (2006.01)

(52) U.S. Cl.
CPC ............. *F03D 7/0204* (2013.01); *F03D 1/04* (2013.01); *F03D 9/25* (2016.05); *F03D 15/00* (2016.05)

(58) Field of Classification Search
CPC . F03D 7/0204; F03D 1/04; F03D 9/25; F03D 15/00
USPC ...................................... 290/44, 55
See application file for complete search history.

(56) References Cited

U.S. PATENT DOCUMENTS

| | | | | |
|---|---|---|---|---|
| 1,734,245 A | * | 11/1929 | Distefano | F03D 15/00 290/55 |
| 2,152,963 A | * | 4/1939 | Irwin | F03D 7/0204 290/55 |
| 2,230,526 A | * | 2/1941 | Claytor | F03D 9/25 290/44 |
| 2,273,084 A | * | 2/1942 | Ansley | F03D 9/11 290/44 |
| 2,784,556 A | * | 3/1957 | Perdue | F03D 80/70 60/398 |

(Continued)

FOREIGN PATENT DOCUMENTS

SU 1409775 A1 7/1988

OTHER PUBLICATIONS

International Search Report and Written Opinion of International Searching Authority for PCT/US2020/019850, ISA/RU, Moscow, Russia, dated Jun. 25, 2020.

*Primary Examiner* — Charles Reid, Jr.
(74) *Attorney, Agent, or Firm* — M&B IP Analysts, LLC

(57) ABSTRACT

A yaw control device for a wind turbine, including: a vertical shaft; and, a vertical wing having a leading edge, a trailing edge, a first wing surface and a second wing surface, wherein the first wing surface extends between a first edge of the leading edge to a first edge of the trailing edge and wherein the second wing surface extends between a second edge of the leading edge to a second edge of the trailing edge; wherein the vertical wing is configured to receive the vertical shaft, and wherein the vertical shaft is biased toward the leading edge of the vertical wing; and wherein the vertical wing rotates about a longitudinal axis of vertical shaft and is configured such that the leading edge faces in the direction of an approaching wing.

2 Claims, 2 Drawing Sheets

(56) References Cited

U.S. PATENT DOCUMENTS

| | | | | |
|---|---|---|---|---|
| 4,068,132 | A * | 1/1978 | Bardekoff | F03D 13/20 290/55 |
| 8,334,610 | B2 * | 12/2012 | Migliori | F01D 17/10 290/44 |
| 10,590,915 | B2 | 3/2020 | Takahashi | |
| 10,619,510 | B2 | 4/2020 | Kets | |
| 2009/0191057 | A1 * | 7/2009 | Knutson | F03D 3/0454 416/23 |
| 2010/0314873 | A1 * | 12/2010 | Stone | H02P 9/04 290/44 |
| 2011/0070065 | A1 * | 3/2011 | Lu | F03D 80/60 415/1 |
| 2012/0056425 | A1 * | 3/2012 | Cousineau | H02P 9/006 290/44 |
| 2013/0017084 | A1 * | 1/2013 | Anderson | F03D 3/068 416/1 |
| 2016/0169031 | A1 * | 6/2016 | Kets | B64C 11/346 416/147 |
| 2019/0233060 | A1 * | 8/2019 | Moffat | B63B 35/44 |

* cited by examiner

YAW CONTROL DEVICE FOR A WIND TURBINE

CROSS-REFERENCE TO RELATED APPLICATIONS

This application is a continuation application of an International Application No. PCT/US2020/019850 filed on Feb. 26, 2020, which claims the benefit of U.S. Provisional Application No. 62/810,557 filed on Feb. 26, 2019, the contents of which are hereby incorporated by reference.

TECHNICAL FIELD

The present disclosure generally relates to wind turbines and, more specifically, to a yaw control device for a wind turbine.

BACKGROUND

A wind turbine is a device that converts kinetic wind energy into electrical energy through a rotary turbine connected to a generator. Wind turbines are manufactured in a wide range of vertical and horizontal configurations. The smallest turbines are used for minimal power applications, such as battery charging for auxiliary power on boats or caravans or to power traffic warning signs. Larger turbines can be used for generating contributions to a domestic power supply while selling unused power back to the utility supplier via the electrical grid.

Wind turbines are becoming an increasingly important source of renewable energy and are used by many countries as part of a strategy aimed to reduce their reliance on fossil fuels.

Known wind turbine systems are generally configured either as horizontal axis systems, where the rotating shaft attached to the blades is arranged in a horizontal direction, or as vertical axis systems, where the rotating shaft is arranged in a vertical direction. Vertical axis wind turbines rotate in the same position irrespective of wind direction, whereas horizontal axis wind turbines must be rotated to be positioned to face the wind direction in order to rotate and operate efficiently.

One key disadvantage of known wind turbine systems is the inability to adequately maintain optimal placement of the rotor blades when responding to a change in wind direction.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a yaw control device for a wind turbine, including: a vertical shaft; and, a vertical wing having a leading edge, a trailing edge, a first wing surface and a second wing surface, wherein the first wing surface extends between a first edge of the leading edge to a first edge of the trailing edge and wherein the second wing surface extends between a second edge of the leading edge to a second edge of the trailing edge; wherein the vertical wing is configured to receive the vertical shaft, and wherein the vertical shaft is biased toward the leading edge of the vertical wing; and wherein the vertical wing rotates about a longitudinal axis of vertical shaft and is configured such that the leading edge faces in the direction of an approaching wing.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
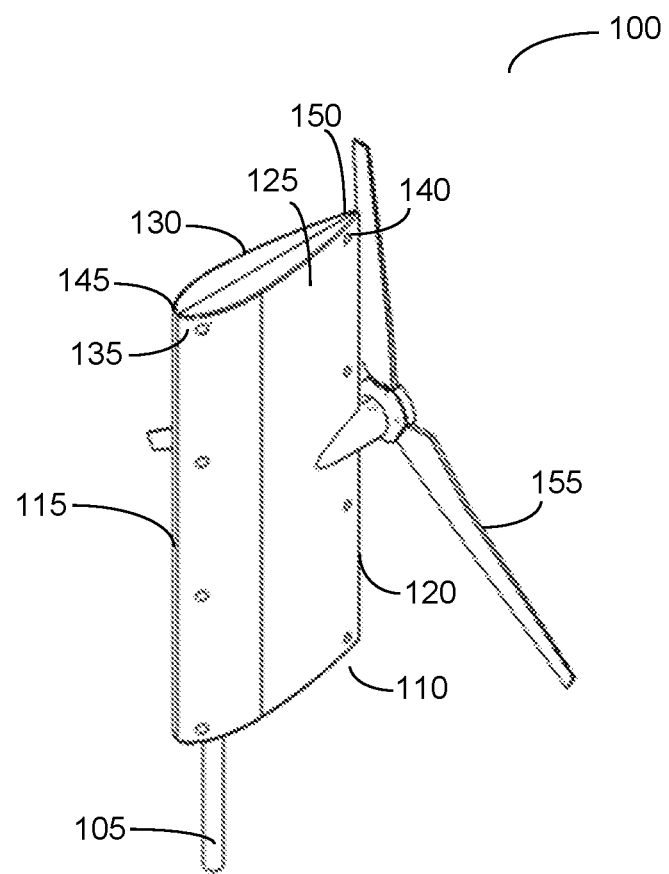
FIG. 1 is a schematic diagram of a yaw control device for a wind turbine according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is a schematic diagram of a yaw control device 100 for a wind turbine according to an embodiment. The device 100 includes a vertical shaft 105 configured to be received by a vertical wing 110 having a leading edge 115, a trailing edge 120, a first wing surface 125 and a second wing surface 130. The first wing surface 125 extends between a first edge 135 of the leading edge 115 to a first edge 140 of the trailing edge 120. The second wing surface 130 extends between a second edge 145 of the leading edge 115 to a second edge 150 of the trailing edge 120. The vertical wing 110 is adapted to receive the vertical shaft 105 in proximity of the leading edge 115, such that the vertical wing 110 rotates towards an approaching wind about a longitudinal axis of the vertical shaft 105.

In an embodiment, the device 100 further includes a plurality of rotor blades 155. The rotor blades 155 are connected to at least a portion of the trailing edge 120. The rotor blades 155 may be connected through a driveshaft (shown in FIG. 2) configured to transfer the rotational movement of the rotor blades to an electric generator or other engine configured to convert the rotational motion into electric power. In an embodiment, the electric generator is placed in an interior volume defined by the first wing surface 125 and the second wing surface 130. It should be noted that the driveshaft may be either directly or indirectly connected to an electric generator, as described further below.

The yaw control device 100 is configured to rotate the vertical wing 110 such that the leading edge 115 is directed toward an approaching wind. As the wind direction changes, the leading edge 115 maintains its position in relation to the wind to ensure the leading edge 115 consistently faces toward the direction of the incoming wind. It should be noted that the rotation speed of the rotor blades 155 is affected by the yaw of the leading edge 115 relative to the wind. That is, when the leading edge 115 is configured to continuously rotate towards the wind, exposure of the rotor blades 155 to the wind forces is maximized, causing them to rotate more quickly, which optimizes the production of electric power. The resulting power production is higher compared to a fixed wind turbine, where a change in wind direction can cause deceleration of the rotor blades' speed and a decrease in energy production.

As an example, in FIG. 1 when a wind approaches from the left side of the figure to right, the vertical wing 110 rotates about the vertical shaft 105 such that the leading edge 115 faces the approaching wind coming from the left side of FIG. 1. Thus, the leading edge 115 is the first component of the wind turbine that the wind meets. As the air flow continues along the vertical wing 110, the wind moves toward the trailing edge 120 and the rotor blades 155. Thus, the wind applies pressure to the rotor blades 155, which causes the rotor blades 155 to create rotational movement, allowing an internal electric generator to generate electric energy. When wind direction changes, e.g., the wind approaches from right to left, the vertical wing 110 rotates about the longitudinal axis of the vertical shaft 105 such that the leading edge 115 faces the approaching wind coming from the right side. Thus, the leading edge 115 remains the first component of the wind turbine that the wind engages with.

It should be noted that the shape of the vertical wing 110 allows for the yaw control device 100 to rapidly and automatically change the position of the vertical wing 110, and therefore the position of the rotor blades 155, with respect to the wind, while maintaining the rotation motion and speed of the rotor blades 155. The vertical wing 110 is configured to rotate relative to the direction of the wind due to its shape and configuration. Because the vertical wing 110 is configured to rotate about the axis of rotation of the vertical shaft 105, and the majority of surface area and mass of the vertical wing 110 is biased toward the trailing edge 120 and the rotor blades 155 and away from the axis of rotation, the wind flow will cause the entire vertical wing 110 to rotate such that the end of the wing 110, namely the rotor blades 155, face away from the direction of the wind. This rotation occurs without the need for additional electronic or mechanical assistance, and thus provides an efficient manner of ensuring that the rotor blades 155 are optimally exposed to the wind. Further, because there is no need for internal gear or motors, the vertical wing 110 can rotates without resistance, and thus more quickly than if controlled by external means.

Figure 2:
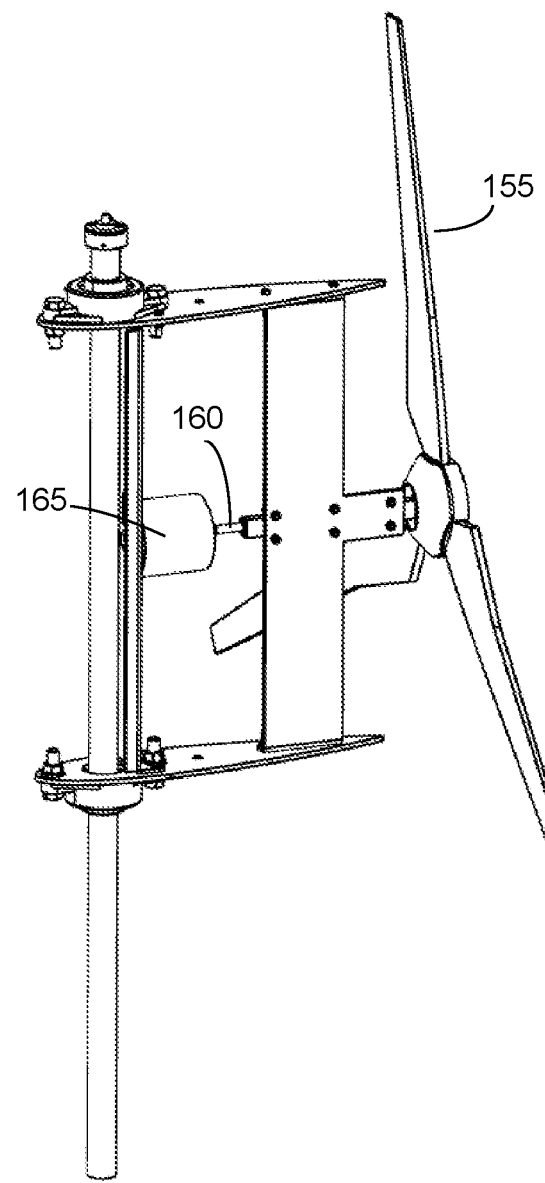
FIG. 2 is a schematic diagram of the yaw control device with the first wing surface and second wing surface removed according to an embodiment.

FIG. 2 is a schematic diagram of the yaw control device 100 with the first wing surface and second wing surface removed according to an embodiment. It should be noted that the embodiment displayed without the wing surfaces is shown for purposes of clarity only.

In an embodiment, the rotor blades 155 are connected to an electric generator via a driveshaft 160. The driveshaft 160 is designed to transfer the rotational motion of the rotor blades 155 to an electric generator 165 configured to convert the rotational movement generated by the rotor blades 155 into electric energy. It should be noted that the driveshaft 160 may be directly or indirectly connected to an electric generator 165. For example, in an embodiment the driveshaft 160 is first connected to a gear box, which is connected to the electric generator 165. A gear box, similar to a transmission, is a device configured to change the rotational speed or torque of the driveshaft received directly from the rotor blades to transfer the rotational energy most efficiently to the generator.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A yaw control device for a wind turbine, comprising:
   a vertical shaft;
   a vertical wing having a leading edge, a trailing edge, a first wing surface and a second wing surface, wherein the first wing surface extends between a first edge of the leading edge to a first edge of the trailing edge and wherein the second wing surface extends between a second edge of the leading edge to a second edge of the trailing edge; and
   at least one rotor blade disposed toward the trailing edge of the vertical wing;
   wherein the vertical wing is configured to receive the vertical shaft, and wherein the vertical shaft is biased toward the leading edge of the vertical wing, and wherein a majority of a surface area and mass of the vertical wing are biased toward the trailing edge of the vertical wing; and wherein the vertical wing is adapted to rotate about a longitudinal axis of the vertical shaft when a wind approaches from a direction such that the leading-edge faces in the direction of the approaching wind; and wherein the at least one rotor blade is a plurality of rotor blades, wherein the plurality of rotor blades is connected to the trailing edge of the vertical wing.

2. The yaw control device of claim 1, further comprising:

a driveshaft connected to the at least one rotor blade; and an electric generator, wherein the electric generator is connected to the at least one rotor blade via the driveshaft.

\* \* \* \* \*